3,071,621
DEALKYLATION OF ALKYLATED THIOPHENOLS
Metro D. Kulik and Martin B. Neuworth, Pittsburgh, Pa., assignors to Consolidation Coal Company, Pittsburgh, Pa., a corporation of Pennsylvania
No Drawing. Filed Mar. 8, 1961, Ser. No. 94,160
12 Claims. (Cl. 260—609)

This invention relates to the dealkylation of alkylated thiophenols. More specifically, it relates to the removal of branched-chain alkyl groups from the ring of an alkyl-substituted thiophenol in the presence of a ring dealkylation acid catalyst.

"Dealkylation" and "ring dealkylation" are used herein synonymously to mean a splitting off of a nuclearly attached branched-chain alkyl group from the nucleus or ring. "Sulfide cleavage" refers to the splitting off of a branched-chain alkyl group attached to the sulfur atom of an alkyl aryl sulfide. "Dealkylation of an alkylated thiophenol" refers to removal of a nuclearly attached branched-chain alkyl group from a ring-alkylated thiophenol or from a sulfide thereof, unless the presence of the latter is excluded by the context in which used. "Branched-chain alkyl" refers to an alkyl group having a carbon atom attached to a nuclear carbon atom (ring) or to the sulfur atom of the S-alkylated thiophenol (sulfide), the attaching carbon of the alkyl group being a secondary or tertiary carbon atom.

The preparation of ring-alkylated thiophenols substituted in the para position of the ring with a t-alkyl group has been described in copending applications Serial Nos. 70,413, 70,405, and 70,443, all filed November 21, 1960, and assigned to the assignee of this invention. The preparation of ring-alkylated thiophenols alkylated in the ortho position of the ring with a sec-alkyl group has been described in copending applications Serial Nos. 70,424, 70,404, and 70,425, all filed November 21, 1960, and assigned to the assignee of this invention. In order to separate thiocresol isomers or to obtain certain ring-alkylated thiophenols in high purity and in high yield, or to accomplish useful syntheses, a ring dealkylation process is required. This invention is of utility, for example in accomplishing the hitherto unknown separation and recovery of individual thiocresol isomers from mixed thiocresols, as shown in copending application Serial No. 70,657, filed November 21, 1960, and assigned to the assignee of this invention. Furthermore, this process enables the obtaining in high yield of a mono-sec-alkylthiophenol from a thiophenol by dealkylation of di-sec-alkyl-thiophenols and recycle of the thiophenol for further sec-alkylation. No methods are known in the prior art for removing an alkyl group from the ring of a thiophenol.

Accordingly, it is an object of the present invention to provide a method for dealkylating branched-chain alkylated thiophenols.

It is a further object to provide a method for removing a t-alkyl group from the para position of the ring of an alkylated thiophenol.

It is another object to remove a sec-alkyl group from the ortho position of the ring of an alkylated thiophenol.

It is yet a further object to provide a selective ring dealkylation process for dealkylating branched-chain ring-alkylated thiophenols in high yield and in high purity.

In accordance with this invention, it has been found that it is feasible to ring dealkylate a branched-chain ring-alkylated thiophenol. This is accomplished by reacting the thiophenol in the presence of a ring dealkylation solid acid catalyst at selected elevated temperatures between 150 and 500° C.

The term "ring dealkylation of a branched-chain alkyl group" specifically includes the removal of a t-alkyl group from the para position of the ring of a 4-t-alkylthiophenol or the removal of a sec-alkyl group from an ortho position of the ring of a 2-sec-alkylthiophenol. Where methyl groups are also present on the ring of the thiophenol, e.g., as in branched-chain alkylated thiocresols and thioxylenols, the methyl groups are not affected by the dealkylation reaction. Removal of a sec-alkyl group is more difficult to accomplish than removal of a t-alkyl group. The removal of a t-alkyl group from the para position of the ring of an alkyl-substituted thiophenol is accomplished at a temperature between 150 and 500° C. and preferably between 200 and 300° C. The removal of a sec-alkyl group from an ortho position of the ring of a thiophenol is accomplished at a temperature between 150 and 500° C. and preferably between 250 and 400° C. While catalyst concentration is not critical per se, since heterogeneous catalysis is involved, too low a catalyst concentration results in a marked increase in reaction time. Catalyst concentrations of from 1 to 20 percent are preferred. Depending upon the alkyl group to be removed, the reaction temperature used, and the catalyst concentration present, reaction times in the liquid phase ranging from 10 minutes to 12 hours are suitable, lower temperatures requiring longer reaction times. Preferred branched-chain alkyl substituents on the ring include from 3 to 16 carbon atoms. An alkyl group of lower molecular weight such as isopropyl is more firmly attached to the ring than sec-butyl, and hence the removal of the latter higher molecular weight branched-chain alkyl substituent is more easily accomplished.

The selection of the ring dealkylation solid acid catalyst is a critical factor in achieving a dealkylation of practical significance and of commercial utility. A successful catalyst for accomplishing the ring dealkylation must actively and selectively remove the t-alkyl or sec-alkyl group from the ring without causing (a) concurrent dealkylation of any methyl groups present, (b) desulfurization of the thiophenol, and (c) significant sulfide formation or polymerization. It is further desirable that the catalyst be relatively inexpensive or have a sufficiently long life with respect to its catalytic activity. It should also be chemically stable and inert with respect to the various reactants and reaction products, particularly because it has been discovered that elevated temperatures are required for establishing dealkylating conditions.

Only a relatively few materials have been found to provide the foregoing requirements to any practical degree. By contrast, dealkylation catalysts conventionally used in the dealkylation of hydrocarbons and phenols at considerably milder temperatures, such as sulfuric and phosphoric acids, are ineffectual, either being inactive or highly destructive.

A preferred class of solid acid catalysts which are active and selective for the ring dealkylation of ring-alkylated thiophenols includes solid phosphoric acid and the natural and synthetic acid clays. Exemplary of effective natural clays are the activated acid-washed bentonites or related montmorillonite-containing clays. Among synthetic clays are included silica-alumina, silica-magnesia, and alumina-boria. These acidic activated natural clays and synthetic clays, as well as solid phosphoric acid, are known to the art as catalytic agents in the cracking of gas oil and are commercially available.

Catalysts prepared by activating natural clays by acid treatment are commercially available under the trade names of Filtrol, Super-Filtrol, KSF clay, and the like. The acidic silica-alumina and related synthetic clay catalysts are readily prepared. For conversion of silica to an acidic catalyst, the addition of only a small proportion of alumina (less than one weight percent) is needed, although commercial catalysts may contain as much as 25 weight percent of alumina, usually about 5 to 20 weight percent. Silica-alumina catalyst is exemplary of a preferred one of the synthetic acid clays, which also include alumina-boria and silica-magnesia catalysts. These catalysts may be prepared by methods known to the art, as for example, by precipitating silica from a solution of sodium silicate, preferably removing the sodium ions, and depositing thereon or admixing therewith alumina, magnesia, or the like. The catalyst must be acidic in nature. The acid strength of solid materials can be readily determined by the method of Cheves Walling, J. Am. Chem. Soc. 72 1164 (1950), or by other methods known to the art. To these clay-type catalysts may be added various promoters, such as zirconia, thoria, vanadia, and the like. Such promoters usually do not constitute more than 15 percent of the catalyst, generally from about 1 to about 10 percent thereof. A suitable silica-alumina catalyst is commercially available under the trade name of Houdry synthetic catalyst, type S–16.

Solid phosphoric acid catalyst, as this term is used in the art, refers to a solid porous granular material, e.g., kieselguhr, silica-gel, etc., which has been impregnated with phosphorus pentoxide or with an acid of phosphorus, e.g., phosphoric acid, and then calcined to produce a desired lower state of hydration of the catalyst. The nature and preparation of solid phosphoric acid catalysts are well known in the polymerization art, and numerous prior disclosures set forth the features of these catalysts. One such commercially available solid phosphoric acid catalyst is known as UOP No. 2; another as UOP No. 4.

It has been found that solid phosphoric acid catalyst is a particularly effective ring dealkylation catalyst. For example, the debutylation of 4-t-butyl-o-thiocresol is readily accomplished with minimal degradation of the ring-butylated thiophenol and with almost complete conversion of the 4-t-butyl-o-thiocresol to o-thiocresol and isobutylene. This debutylation proceeds at a suitable rate at a temperature between 200 and 300° C., which is preferred; particularly preferred for this reaction is a temperature between 225 and 260° C. at atmospheric pressure. The pressure in the system is generally a function of the selected temperature employed for a given dealkylation reaction. Atmospheric conditions are convenient and generally preferred, particularly since with this catalyst essentially no degradation of the thiophenol occurs at the elevated temperatures used. A catalyst concentration of from 1 to 20 percent by weight of the 4-t-butyl-o-thiocresol is preferred, with a concentration between 5 and 15 percent by weight being particularly preferred and effective. It is noted that the phosphoric acids per se: 85% phosphoric, 100% phosphoric ($P_2O_5$ plus 85% phosphoric), polyphosphoric, and metaphosphoric (35% commercial) were all essentially ineffective as ring dealkylation catalysts.

In accordance with this invention, the ring dealkylation of an alkylated thiophenol or a sulfide thereof may be accomplished. In the latter compound, the hydrogen attached to the sulfur atom of the thiophenol has been replaced by another substituent. Where the substituent on the sulfur atom is a t-alkyl or sec-alkyl group, removal of this t-alkyl or sec-alkyl group from the sulfur atom (sulfide cleavage) will also occur. Thus, because of the higher temperatures required to accomplish ring dealkylation compared with sulfide cleavage, non-degrading catalysts effective for ring dealkylation are equally suitable for sulfide cleavage, where the same type of alkyl substituents are involved. The converse does not necessarily apply. Thus several catalysts suitable for sulfide cleavage cannot be used for ring dealkylation. In certain instances, e.g., dealkylation of t-butyl 4-t-butyl-o-tolyl sulfide or of isopropyl 2-isopropylphenyl sulfide, it is feasible to accomplish both sulfide cleavage and ring dealkylation in the same operation, the sulfide cleavage occurring first followed by ring dealkylation. However, in other dealkylation reactions because of the possible formation of undesired side products, it is preferred to ring dealkylate thiophenols rather than sulfides. Thus the S-alkyl group would first be cleaved from the sulfur atom, forming the C-alkyl thiophenol. The latter compound would then be isolated and ring dealkylated. This two-stage dealkylation-cleavage reaction is particularly effective where the branched-chain alkyl groups are t-alkyls.

The reactions that occur are relatively complex and for certain compounds mechanistically may involve disproportionation, isomerization, sulfide formation, and sulfide cleavage. However, it has been found that by using the process of this invention in conjunction with a relatively simple selective distillation technique, high yields of the ring-dealkylated thiophenol may be obtained wholly independent of the possible interim formation of undesired side products. For example, where it is desired to debutylate t-butyl 4-t-butyl-o-tolyl sulfide to recover o-thiocresol, if the reaction is carried out in an autoclave where reactants and resultant products are maintained in contact with one another, other products will be recovered along with the desired o-thiocresol. While this may not be disadvantageous for certain purposes, where the desideratum of the process is the recovery of essentially pure o-thiocresol in high yield a selective distillation technique is considerably more effective. In such a technique, the t-butyl 4-t-butyl-o-tolyl sulfide is heated in the presence of the catalyst to a ring dealkylation temperature. The column temperature and pressure are coordinately controlled so that the only product that escapes (other than evolved olefins) is the desired o-thiocresol, which will be lower boiling than the alkylated compounds. These latter compounds are returned to the distillation vessel by reflux. It has been found that a packed distillation column provides a desired scrubbing action so that the evolved o-thiocresol is obtained in a high degree of purity, other products being returned to the vessel for reflux. It is also apparent that in removing the o-thiocresol by this technique, equilibrium is not attained, the reaction being shifted toward formation of additional o-thiocresol.

It has also been found that it is advantageous in certain instances to incorporate an inert hydrocarbon oil, preferably a high-boiling paraffin oil, in the reaction vessel. Thereby operation of the dealkylation reaction at temperatures above the atmospheric boiling point of the reactant is feasible. Also, improvements in conversion and yield, in certain instances, result.

The following examples are intended as illustrative and expository of the invention, and are not to be considered as limitations thereof.

EXAMPLE 1

*Ring Dealkylation of 4-t-Butyl-o-Thiocresol*

4-t-butyl-o-thiocresol, recovered by distillation from a mixture of mixed thiocresols that had been reacted with isobutylene in the presence of boron trifluoride-phosphoric acid as catalyst, was subjected to ring dealkylation over a temperature range of 215 to 310° C. It was found that higher temperatures promoted increased dealkylation of the 4-t-butyl-o-thiocresol. However, as the temperature was increased at a given residence time the tendency of reactants present to form undesired side products by methyl group isomerization became more significant. In general, lower temperatures required longer contact times.

(a) *Pressurized flow over catalyst bed.*—In one series of runs using solid phosphoric acid as catalyst, a pressurized flow system was employed. The 4-t-butyl-o-thiocresol was continuously fed to a bed of catalyst at a pressure between 50 and 75 p.s.i.g. Total contact time between the feed and the catalyst was about one-half hour. The results obtained are shown in Table I.

TABLE I

*Ring Dealkylation of 4-t-Butyl-o-Thiocresol (Fixed Catalyst Bed)*

[Solid phosphoric acid (UOP No. 2) was used as catalyst]

| Run No. | 1 | 2 | 3 |
|---|---|---|---|
| Feed: | | | |
| 4-t-butyl-o-thiocresol, percent | 95.6 | 100 | 100 |
| Mixed tolyl sulfides, percent | 4.4 | | |
| Reaction conditions: | | | |
| Temp., °C | 300 | 275 | 250 |
| Pressure, p.s.i.g | 75 | 50 | 50 |
| Catalyst vol., ml | 250 | 250 | 250 |
| Feed rate, ml./min | 7.2 | 7.2 | 7.2 |
| Linear hourly space velocity | 1.7 | 1.7 | 1.7 |
| Conversion, percent | 67.0 | 50.2 | 15.9 |
| Product distribution, percent: | | | |
| Toluene | 5.1 | 14.1 | 10.2 |
| o-Thiocresol | 88.0 | 72.1 | 89.8 |
| High-boiling sulfur compounds | 6.9 | 13.8 | |
| o-Thiocresol purity: | | | |
| o-Thiocresol | 71.3 | 87.1 | 97.8 |
| m-Thiocresol | 14.4 | 5.8 | } 2.2 |
| p-Thiocresol | 14.3 | 7.1 | |

(b) *Batch reactor.*—In a typical batch reactor run, a sample of 4-t-butyl-o-thiocresol was contacted with 10 weight percent of solid phosphoric acid catalyst (UOP No. 2). The pot temperature was adjusted to 215° C., setting the system pressure at 425 mm. Hg. The reaction product, o-thiocresol, was taken overhead with sufficient reflux so as to return unreacted 4-t-butyl-o-thiocresol to the condenser, isobutylene passing through the condenser. Under optimum conditions, 83.2 percent of the feed was converted in a 12-hour period. The selectivity was excellent, and the yield of o-thiocresol was 94.7 percent in a purity exceeding 99 percent. Both the identity and purity of the recovered o-thiocresol were established by infrared comparison with an authentic analytical grade sample. When the pot temperature was adjusted to 225–250° C. the reaction time was reduced to six hours with similar selectivity occurring. Under essentially similar reaction conditions, silica-alumina and acidic montmorillonite clay were also effective as ring-dealkylation catalysts, although conversions obtained were not as high as with solid phosphoric acid. These ring-dealkylation results are summarized in Table II.

TABLE II

*Ring Dealkylation of 4-t-Butyl-o-Thiocresol (Batch Reactor)*

[For runs 4 and 5, solid phosphoric acid (UOP No. 2) was used as catalyst. Silica-alumina (Houdry S-16) was used as catalyst in run 6. In run 7 an activated acid-washed montmorillonite clay (KSF clay) was used.]

| Run No. | 4 | 5 | 6 | 7 |
|---|---|---|---|---|
| Feed: 4-t-butyl-o-thiocresol, percent | 100 | 100 | 100 | 100 |
| Reaction conditions: | | | | |
| Temp., °C | 215 | 225–250 | 225–250 | 208–310 |
| Pressure, mm. Hg | 225 | 425 | 425 | Atm. |
| Catalyst conc., percent by weight of feed | 10 | 10 | 10 | 10 |
| Reaction time, hrs | 12 | 6 | 6 | 4 |
| Conversion, percent | 83.2 | 89.3 | 40.4 | 100 |
| Product distribution, percent: | | | | |
| Toluene | 3.5 | 1.9 | Trace | [1] 8 |
| o-Thiocresol | 94.7 | 96.3 | 96.1 | 41 |
| High-boiling sulfur compounds | 1.8 | 1.8 | 3.9 | |
| o-Thiocresol purity: | | | | |
| o-Thiocresol | 99.1 | 99.3 | 98.1 | 99+ |
| m-Thiocresol | 0.2 | 0.8 | 1.8 | 0.0 |
| p-Thiocresol | 0.7 | 0.0 | 0.0 | 0.0 |

[1] t-Butyltoluene.

(c) *Stirred reactor.*—The general procedure and apparatus described above with respect to the batch reactor runs was employed, except that the reactor was fitted with an all-glass paddle stirrer to improve contacting of the reactants with the catalyst and to aid in heat transfer between the walls of the reactor and the reaction mixture.

In a typical run using an acid-washed natural clay (Filtrol 20) as catalyst, 4-t-butyl-o-thiocresol was fed continuously to the reactor via a dropping funnel attached to a side neck of a distilling flask. Ten percent by weight of catalyst was employed. A high boiling paraffin oil was included in the reactor to permit operation at temperatures above the atmospheric boiling point of the 4-t-butyl-o-thiocresol. The reaction was maintained at a temperature between 210 and 307° C. for 2½ hours. Seventy-eight percent by weight of the 4-t-butyl-o-thiocresol was converted, o-thiocresol being recovered in a yield of 98 percent by weight based on converted material. In another run performed under similar conditions, also using 10 percent by weight of this catalyst, but performed at a temperature between 202 and 234° C. for 1½ hours, a conversion of 88 percent was obtained; the yield of o-thiocresol obtained was 69 percent by weight based on converted material.

EXAMPLE 2

*Ring Dealkylation of 4-t-Butylthiophenol*

A pressurized reactor was used for these continuous feed runs. 4-t-butylthiophenol was fed at a constant rate by means of a motorized syringe to a section of stainless steel pipe containing solid phosphoric acid (UOP No. 2) in the form of pellets. External heating was used, temperatures being measured by means of a thermocouple located in the center of the catalyst bed. The 4-t-butyl-thiophenol was maintained at reaction temperature for a residence time of 10 minutes. The product mixture obtained was collected in a steel receiver which was pressurized to 50–70 p.s.i.g. with nitrogen to prevent vapor formation in the heated zone. The results obtained are shown in Table III.

TABLE III

*Ring Dealkylation of 4-t-Butylthiophenol in Presence of Solid Phosphoric Acid Catalyst*

| Run No. | Reaction temp. (°C.) | Conversion [1] (mole percent) | Yield of thiophenol [1] (mole percent) |
|---|---|---|---|
| 8 | 225 | 15 | 88 |
| 9 | 250 | 92 | 68 |
| 10 | 270 | 95 | 66 |
| 11 | 300 | 80 | 82 |

[1] Conversions and yields for this continuous run are based on recovered products rather than on feed.

EXAMPLE 3

*Ring Dealkylation of o-Isopropylthiophenol* o-Isopropylthiophenol was fed continuously to the reactor via a dropping funnel attached to a side neck of a distilling flask. The flask was fitted with a paddle stirrer to improve contacting of the reactants with the catalyst and to aid in heat transfer between the walls of the reactor and the reaction mixture. An acid-washed natural clay (Filtrol 20) was used as catalyst in an amount of 40 percent based on the weight of the total material fed to the reactor. A high-boiling paraffin oil was included in the reactor to permit operation at temperatures above the atmospheric boiling point of the reactant. In the packed distilling column used, the reflux ratios and column temperature were adjusted so as to return unreacted materials to the reactor. The reaction was maintained at a temperature between 300 and 325° C. for 1½ hours. Seventy-seven percent by weight of the o-isopropylthiophenol was converted, thiophenol being recovered in a yield of 78 percent by weight based on converted material.

EXAMPLE 4

*Combined Dealkylation and Sulfide Cleavage of Branched-Chain Thiophenols*

(a) *t-Alkyl dealkylation and cleavage.*—Following the procedure shown in Example 1(b), a sample of t-butyl 4-t-butyl-o-tolyl sulfide was reacted in the presence of 12 percent by weight of solid phosphoric acid catalyst (UOP No. 2) at a temperature of 240° C. for 2 hours. Ninety-three percent by weight of the alkylated thiophenol was converted, o-thiocresol being recovered in a yield of 92 percent by weight based on converted material.

(b) *Sec-alkyl dealkylation and cleavage.*—A sample of sec-butyl o-sec-butylphenyl sulfide was similarly reacted in the presence of 15 percent by weight of solid phosphoric acid catalyst. The reaction was performed at a temperature of 310° C. for 3 hours, a high boiling paraffin oil being included in the reactor. Eighty-three percent of the starting material was converted; while o-sec-butylthiophenol was principally recovered (49 percent yield), 6.5 percent of thiophenol was also obtained.

Similarly, following the procedure shown in Example 1(b), isopropyl o-isopropylphenyl sulfide was reacted in the presence of 15 percent by weight of solid phosphoric acid catalyst at a temperature of 300–315° C. for 3 hours. Seventy-eight percent of the starting material was converted; o-isopropylthiophenol was recovered in a yield of 67 percent by weight based on converted material; 12 percent of thiophenol was also obtained.

Isopropyl 2,6-diisopropylphenyl sufide was also both dealkylated and sulfide-cleaved following the foregoing procedure, using 15 percent by weight of solid phosphoric acid as catalyst. After reaction at 295–325° C. for 5 hours, a 79 percent conversion was obtained. The principal product obtained consisted of diisopropylthiophenol (56 percent); 16.4 percent of isopropylthiophenol and 3.5 percent of thiophenol were also recovered, based on converted material.

Isopropyl 2,6-diisopropylphenyl sulfide was reacted in the presence of 13 percent by weight of an acid-washed activated montmorillonite clay (Filtrol 20) using a continuous feed technique in the presence of a paraffin oil, similar to the procedure used in Example 1(c). A temperature of 309–318° C. for 2 hours was maintained. A conversion of 87 percent by weight occurred. Diisopropylthiophenol was the principal product recovered (38 percent), with 36 percent of isopropylthiophenol and 4.3 percent of thiophenol, by weight, based on converted material being also obtained.

It will of course be readily apparent that many different variants of the process of this invention may be employed depending upon the thiophenol being dealkylated and the specific reaction parameters used such as catalyst concentration, reaction temperature, time of reaction, and the like. Also, a batch technique or a semi-continuous or continuous dealkylation process may be employed as illustrated. These variants are considered as falling within the scope of this invention, which should be determined in accordance with the objects and claims thereof.

We claim:

1. The process for dealkylating a thiophenol containing a nuclearly attached branched-chain alkyl group which comprises heating said thiophenol at a temperature between 150 and 500° C. in the presence of a ring dealkylation solid acid catalyst selected from the class consisting of solid phosphoric acid and natural and synthetic acid clays.

2. The process according to claim 1 wherein said catalyst is solid phosphoric acid.

3. The process according to claim 1 wherein said catalyst is acidic silica-alumina.

4. The process for dealkylating a thiophenol containing a t-alkyl group in the para position of the ring which comprises heating said thiophenol in the presence of a ring dealkylation solid acid catalyst selected from the class consisting of solid phosphoric acid and natural and synthetic acid clays at a temperature between 200 and 300° C.

5. The process according to claim 4 wherein said catalyst is solid phosphoric acid.

6. The process for dealkylating a thiophenol containing a sec-alkyl group in an ortho position of the ring which comprises heating said thiophenol in the presence of a ring dealkylation solid acid catalyst selected from the class consisting of solid phosphoric acid and natural and synthetic acid clays at a temperature between 250 and 400° C.

7. The process according to claim 6 wherein said catalyst is solid phosphoric acid.

8. The process according to claim 6 wherein said catalyst is an acid-washed activated natural clay.

9. The process for dealkylating a thiophenol containing a nuclearly attached branched-chain alkyl group to form a lower boiling dealkylated thiophenol in high yield, which comprises charging the alkylated thiophenol and a ring dealkylation solid acid catalyst selected from the class consisting of solid phosphoric acid and natural and synthetic acid clays to a distillation apparatus including a reaction vessel and a distillation column, heating said alkylated thiophenol at a dealkylating temperature between 150 and 500° C. under reflux conditions, maintaining the vessel and the column at a selected temperature so that unreacted alkylated thiophenol is returned to the reaction vessel and lower boiling dealkylated thiophenol is permitted to escape from the column, and recovering said lower boiling dealkylated thiophenol in high yield.

10. The process according to claim 9 wherein an inert hydrocarbon oil is present in the reaction vessel during the dealkylation reaction.

11. The process according to claim 9 wherein 4-t-butyl-o-thiocresol is dealkylated and o-thiocresol is recovered in high yield.

12. The process according to claim 9 wherein said catalyst is solid phosphoric acid.

References Cited in the file of this patent

Reid: Organic Chemistry of Bivalent Sulfur, vol. 2, p. 61 (1960), Chemical Pub. Co. Inc., N.Y., N.Y.